No. 733,210. PATENTED JULY 7, 1903.
W. S. JOHNSON.
THERMOSTATIC TEMPERATURE REGULATOR.
APPLICATION FILED SEPT. 5, 1902.
NO MODEL. 2 SHEETS—SHEET 1.
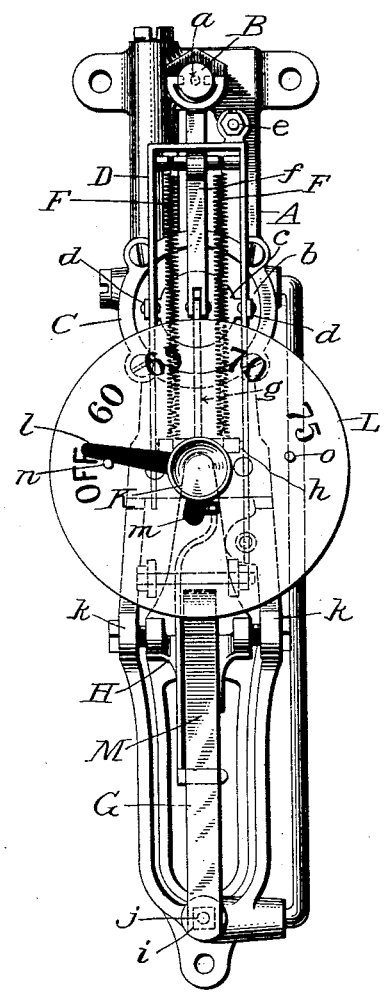
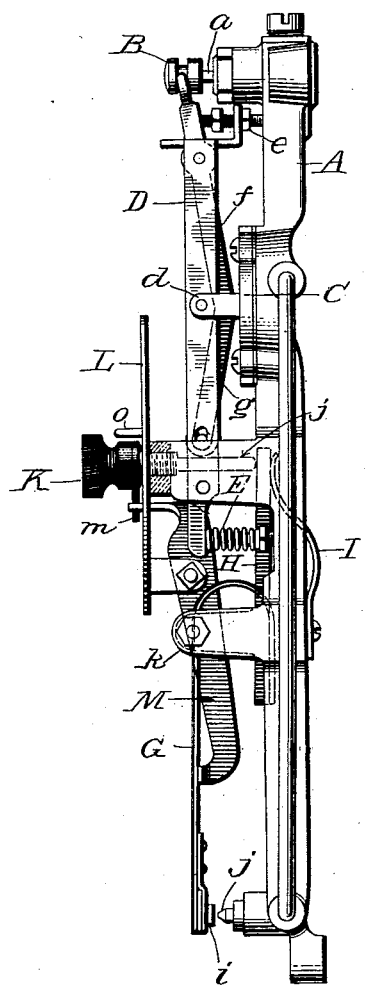
Witnesses
Inventor.
Warren S. Johnson,
by Dodge and Sons,
Attorneys.

No. 733,210. PATENTED JULY 7, 1903.
W. S. JOHNSON.
THERMOSTATIC TEMPERATURE REGULATOR.
APPLICATION FILED SEPT. 5, 1902.
NO MODEL. 2 SHEETS—SHEET 2.
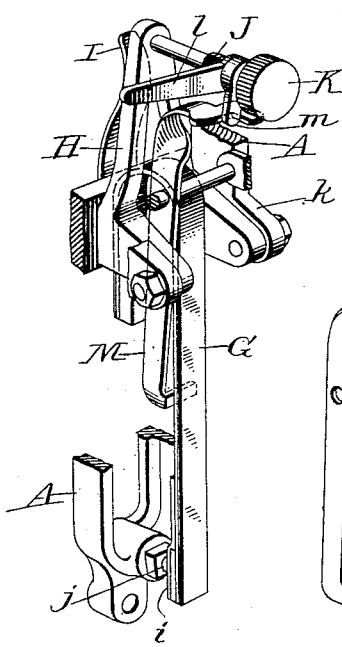
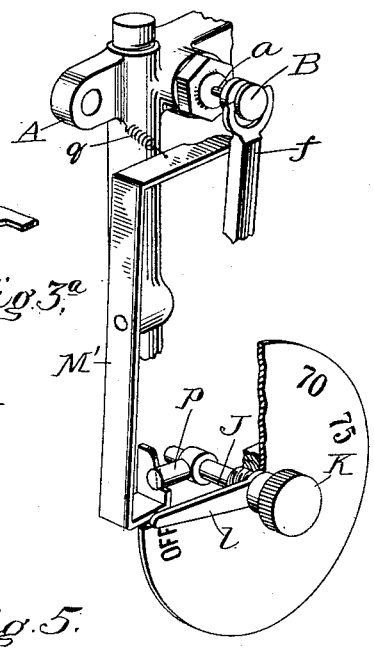
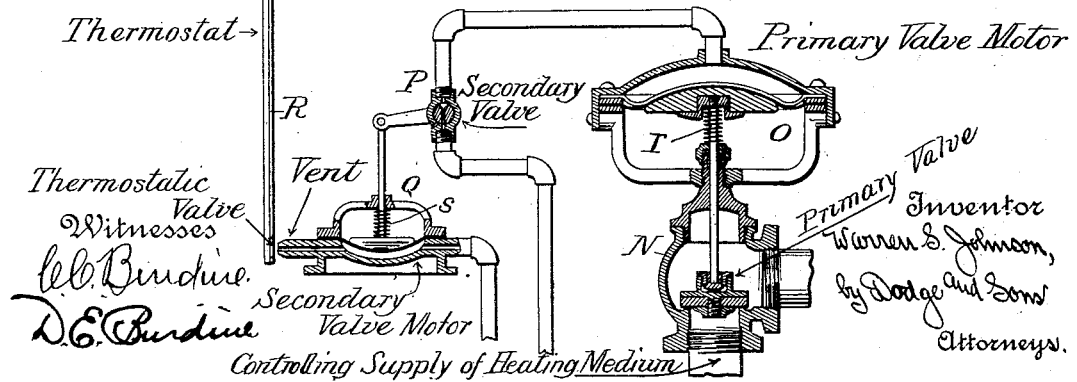

No. 733,210. Patented July 7, 1903.

UNITED STATES PATENT OFFICE.

WARREN S. JOHNSON, OF MILWAUKEE, WISCONSIN.

THERMOSTATIC TEMPERATURE-REGULATOR.

SPECIFICATION forming part of Letters Patent No. 733,210, dated July 7, 1903.

Application filed September 5, 1902. Serial No. 122,233. (No model.)

*To all whom it may concern:*

Be it known that I, WARREN S. JOHNSON, a citizen of the United States, residing at Milwaukee, in the county of Milwaukee and State of Wisconsin, have invented certain new and useful Improvements in Thermostatic Temperature-Regulators, of which the following is a specification.

My invention relates to the automatic regulation or control of temperature in buildings, and is designed to enable the occupant of a room or apartment to render the automatic devices temporarily inoperative and to completely shut off the supply of heat when desired.

In the accompanying drawings I have illustrated the invention as incorporated in or combined with a thermostatic valve-controlling mechanism of the character set forth in Letters Patent of the United States granted and issued to me on the 16th day of July, 1895, and numbered, respectively, 542,708 and 542,733, the thermostat here illustrated being, however, arranged to work directly in and out relatively to the front or face of the instrument instead of in a plane parallel with said face, as in Patent No. 542,733.

In the drawings, Figure 1 is a face view or elevation of a thermostat embodying my present invention; Fig. 2, a side elevation thereof; Fig. 3, a perspective view of those parts directly involved in the present improvement; Fig. 3ª, a perspective view of the interposed lever by itself; Fig. 4, a perspective view illustrating a modified embodiment of said invention, and Fig. 5 a diagrammatic view illustrating the system of temperature regulation to which my improvements are preferably applied.

The thermostatic device here illustrated, and which is simply taken as a type and for convenience of explanation, is designed for use in a system of heat-regulating apparatus such as is set forth in Patent No. 542,733 above mentioned, and in which there are combined a primary, a secondary, and a tertiary valve, fluid-pressure motors for actuating the primary and secondary valves, and a thermostat for operating the tertiary valve, the primary valve serving to regulate the heat-supply, the secondary valve serving to control the delivery and release of fluid-pressure to and from the primary-valve motor, and the tertiary valve serving to open and close an outlet of the fluid-pressure motor of the secondary valve, and thereby to control the fluid-pressure of the secondary-valve motor. It is, however, to be understood that the invention is not restricted to use in this particular form or type of apparatus and that it is selected merely as the highest development of heat-controlling apparatus known to me and one in which the present invention can be most advantageously incorporated.

Referring again to the drawings, A indicates a main frame or backing which in practice is provided with channels or passages for the flow of air or other fluid by which the main or primary and the secondary valves above alluded to are actuated.

B indicates a circumferentially - grooved head carried by the stem $a$ of the secondary valve controlling admission of pressure fluid to the secondary fluid-pressure motor C, by which the stem $a$ of the secondary valve is moved and said valve is actuated to admit fluid to the motor C or to cut off the supply of such fluid.

The motor C consists, as before, of a chamber formed in the frame or backing A and a flexible diaphragm or movable wall $b$, against which rests a diaphragm-plate $c$, having arms $d$, which connect with a swinging yoke or frame D, pivoted at a point between its ends and pressed outward at its lower end by a spring E, bearing upon the depending arm of said yoke. The play of the yoke is restricted and determined by adjustable stops $e$, as before, and there is carried in said yoke a toggle-lever comprising an upper member $f$ and a lower member $g$, pin-jointed at their meeting ends, and the lower member arranged to slide a limited distance upon its lower pin or support. Springs F, connecting a cross-bar $h$ (carried by the lower end of toggle member $g$) with an upper support, as the pivot pin or rod of the upper member $f$, serve to carry upward the lower member of the toggle and to break or bow said toggle, as in Fig. 2, when not prevented from so doing by fluid-pressure acting upon the diaphragm $b$. The upper extremity of toggle member $f$ is made in the form of a fork or yoke, the inwardly-projecting studs or arms of which enter a circumferential groove in the head B of the secondary valve, before referred to, and serve at the proper times to move said valve outward or to a position where pressure fluid is permitted to pass from the reservoir or supply to the motor of the primary valve and to cause the closing of said primary valve and the consequent cutting off of the heat-supply.

The motor C is controlled in its action by a thermostatic device, here represented as comprising a bimetallic bar G, carrying at its free end a valve disk or pad $i$, which serves to seal or when withdrawn therefrom to vent a nipple $j$, communicating by a suitable pipe or passage with the interior of the chamber of motor C. This nipple and the passage with which it is connected are of greater area than the inlet through which motor C receives its pressure fluid. Hence said motor will collapse and its movable wall or diaphragm will be forced inward under the pressure of spring E whenever such vent is opened. As the yoke D is thus moved inward the fork of member $f$ of the toggle, being prevented by the head B of the double valve from moving farther inward, becomes a fulcrum or pivotal support for said member $f$, which consequently swings about its pivot in the frame or yoke D and causes the connection between the upper and lower members $fg$ to swing to the right of a plane passing through the pivot-axis of member $f$ and the gudgeons or pivots of cross-bar $h$ of the lower member $g$, whereupon the springs F throw the toggle suddenly to the position indicated in Fig. 2, thereby moving outward the head B and quickly opening the valve carried by stem $a$. This permits the pressure fluid to pass to the motor of the main valve and to close the same against further ingress of heating medium.

Thermostatic bar G is carried by a swinging plate H, pivotally supported in arms $k$ of the frame or backing A, the upper end of which plate is urged outwardly by spring I, but may be forced inwardly a greater or less distance against the resistance of said spring by a screw-threaded stem J, Figs. 2 and 3. This adjustment serves to determine the position of valve pad or disk $i$ at a given temperature, and consequently to enable it to be set so as to vent or to seal the nipple $j$ at any predetermined temperature within the range provided.

The stem J carries an indicator-arm $l$, provided with a lateral arm $m$, as seen in Figs. 1, 2, and 3, and it is also furnished with a milled button or knob K, by which it may be turned.

L indicates a dial over which the arm $l$ sweeps and which is provided with stop-pins $n$ $o$ to limit the throw of indicator-arm $l$ and the consequent turning of stem J. The dial is graduated or divided off into spaces and marked with figures or other characters indicating different degrees of temperature—as, for instance, "60," "65," "70," and "75," though, of course, any other limits and subdivisions may be adopted at will. From 60° to 75° is the usual range within which regulation is desired, and ordinarily from 68° to 70° represents the desired temperature. In swinging to its extreme throw toward the left under the arrangement here shown, which represents the lowest temperature obtainable with the device, the arm $l$ passes beyond the range of the figures or characters indicated and points to the word "Off" or other mark indicating that the heat-supply is entirely cut off. As arm $l$ moves to this position the shorter arm $m$ swings downward and makes contact with the beveled edge or face of the upper arm of a lever M, fulcrumed, under the construction here shown, in arms or brackets projecting from the rear face of the dial L. The lower arm of lever M is arranged to stand directly behind the thermostatic bar G, but to exert no pressure thereon and not necessarily to make contact therewith so long as the indicator-arm $l$ points to any of the graduations from "60" to "75" or whatever other limits of regulation may be adopted. When, however, the indicator-arm $l$ is swung to the stop-pin $n$ or to the indication "Off," arm $m$, riding upon the beveled or inclined face of the upper arm of lever M, forces the same back, and consequently moves forward the lower arm of said lever, which lower arm being longer has greater amplitude of movement and causes said lever to press outward and to hold away from the nipple $j$ the pad $i$, carried by the thermostatic bar G. The valve disk or pad $i$ being thus forcibly removed and held away from nipple $j$, the chamber of fluid-pressure motor C is vented and remains vented so long as the indicator is set to the adjustment mentioned, and as a consequence the double or secondary valve carried by stem $a$ is adjusted to permit the passage of pressure fluid to the primary motor controlling the main heat-supply valve and to maintain the delivery of pressure fluid thereto so long as the stated adjustment of the indicator continues.

The above-described mechanism is found in practice to be admirably adapted to the purpose in view. It is simple and efficient in construction and operation and may be readily applied to apparatus already in existence. I wish it distinctly understood, however, that I do not mean in any sense to restrict myself to any specific form or embodiment of the invention nor to its use with the system of temperature regulation and control herein referred to. I believe myself to be the first to provide automatic temperature-regulating apparatus with means whereby the indicator may be so set as to permanently exclude during the retention of such adjustment heating medium from the heating appliance or the apartment controlled by such apparatus, and this I mean to claim broadly and without restriction to any specific form of apparatus or details of construction.

One variation of the invention is illustrated in Fig. 4, wherein A indicates the back or frame; $a$ the stem, and B the head, of the double valve controlling the supply of pressure fluid to the motor of the main valve; $f$, the upper member of the toggle, (shown in Figs. 1 and 2;) L, the dial; J, the threaded stem; $l$, the indicator-arm carried thereby, and K the knob or button upon said stem. In this form of the device the stem J is provided with a radially-projecting stud $p$, which acts upon the beveled edge or face of the lower arm of the lever M', fulcrumed upon the main frame or backing and having its upper end arranged in the rear of the upper extremity of the member $f$ of the toggle, said lever being normally drawn inward at its upper end by a light spring $q$. Under the construction here set forth when the arm $l$ is moved to the point or indication "Off" the lateral stud or projection $p$, bearing upon the beveled face of the lever M', swings said lever about its pivot or fulcrum and causes its upper end to force outward the yoke or fork of toggle $f$, and thereby to move outward the stem, and consequently the disk or pad of the valve controlling the supply of pressure fluid to the motor of the main valve, thus opening said valve and permitting the pressure fluid to flow to said motor and close the main valve.

Many other variations or modifications of the device may be made without in any sense departing from the spirit and scope of my invention.

In order that the operation or the effect of the above-described device may be more fully understood, I have reproduced in Fig. 5 the diagram of Patent No. 542,733. In this figure, N indicates the primary valve controlling the supply of steam, water, or other heating medium; O, the fluid-pressure motor for closing said valve, a spring $r$ being provided to open the valve when the motor is vented; P, the valve controlling the delivery of pressure fluid to the motor O or venting said motor, as required; Q, a fluid-pressure motor serving to actuate the valve P to vent the motor O, a spring $s$ being provided to open said valve and seal the vent, and R being the thermostatic bar or device, carrying a valve pad or disk $t$, which closes the nipple or vent $u$ of the motor Q. The valve P in this diagram corresponds to the double valve carried by stem $a$ in the other figures.

What I desire to claim as my invention is—

1. In an appliance for controlling the temperature of an apartment, a valve controlling the admission of heat to said appliance; a thermostat located in the apartment and serving to operate said valve; and an adjusting device for determining the temperature at which said thermostat shall act, said adjusting device, in a certain position, serving permanently to exclude the heat from the heating appliance through its action on the thermostatic controlling mechanism.

2. In a temperature-controlling apparatus, the combination of a thermostatic device adapted mediately or immediately to control the supply or delivery of heating medium; an adjusting device for said thermostat, serving to determine the point or degree of temperature at which it shall act; and means, substantially as described, actuated and controlled by said adjusting device, whereby upon the movement of the adjusting device to a predetermined point the thermostat is thrown out of action and the supply of heating medium is thereby permanently cut off so long as the adjusting device remains at such point.

3. In a temperature-controlling apparatus, the combination of a thermostat, and an adjusting device therefor adapted, when thrown to a predetermined position, to put and hold the thermostat out of action.

4. In a temperature-controlling apparatus, the combination of a thermostatic device adapted normally to control automatically the temperature of a room or apartment; and an adjusting device for said thermostat serving to set and determine its range of action, and adapted, when moved to a predetermined point, to throw and hold said thermostatic device out of action, substantially as described.

5. In combination with a valve-damper or other device for controlling the delivery of heating medium to a space or apartment to be heated, a valve controlling, directly or indirectly, the delivery of heating medium to said space or apartment; a thermostat normally acting to control automatically the adjustment of said valve in accordance with temperature requirements; and an adjusting device serving to determine the range of action of the thermostat and, when thrown to a predetermined position, to prevent the thermostat from effecting an opening of the valve controlling supply of heating medium.

6. In combination with a thermostat, an adjusting device therefor; and intermediate means whereby upon the movement of the adjusting device to a predetermined or abnormal position the thermostat is held out of action.

In testimony whereof I have signed my name to this specification in the presence of two subscribing witnesses.

WARREN S. JOHNSON.

Witnesses:
CLIFFORD A. LOEW,
WM. MCCONEGHEN.